United States Patent [19]
Keasling et al.

[11] Patent Number: 6,150,157
[45] Date of Patent: Nov. 21, 2000

[54] REDUCTIVE DEHALOGENATION OF ORGANIC HALIDES IN CONTAMINATED GROUNDWATER

[75] Inventors: Jay D. Keasling; Douglas G. Bolesch, both of Berkeley; Thomas A. Delfino, Moraga, all of Calif.

[73] Assignees: The Regents of the University of California, Oakland; Geomatrix Consultants, San Francisco, both of Calif.

[21] Appl. No.: 08/311,426

[22] Filed: Sep. 23, 1994

[51] Int. Cl.[7] ......................................................... B09B 3/00
[52] U.S. Cl. ........................................ 435/262.5; 435/262
[58] Field of Search ................................ 435/262, 262.5; 210/610, 611, 908

[56] References Cited

U.S. PATENT DOCUMENTS

| | | | |
|---|---|---|---|
| 4,925,802 | 5/1990 | Nelson | 435/262 |
| 5,024,949 | 6/1991 | Hegeman | 435/262 |
| 5,232,596 | 8/1993 | Castaldi | 210/603 |
| 5,277,815 | 1/1994 | Beeman | 210/605 |

OTHER PUBLICATIONS de Briun et al., "Complete Biological Reductive Transformation of Tetrachloroethene to Ethane", *App. and Environ. Micro.* 58(6):1996–2000 (1992).

DiStefano et al., "Hydrogen as an Electron Donor for Dechlorination of Tetrachloroethene by an Anaerobic Mixed Culture", *App. and Environ. Micro.* 58(11):3622–3629 (1992).

DiStefano et al., "Reductive Dechlorination of High Concentrations of Tetrachloroethene to Ethene by an Anaerobic Enrichment Culture in the Absence of Methanogenesis", *App. and Environ. Micro.* 57(8):2287–2292 (1991).

Fathepure and Vogel, "Complete Degradation of Polychlorinated Hydrocarbons by a Two–Stage Biofilm Reactor", *App. and Environ. Micro.* 57(12):3418–3422 (1991).

Freedman and Gossett, "Biodegradation of Dichloromethane and Its Utilization as a Growth Substrate under Methanogenic Conditions", *App. and Environ. Micro.* 57(10):2847–2857 (1991).

Freedman and Gossett, "Biological Reductive Dechlorination of Tetrachloroethylene and Trichlorethylene to Ethylene under Methanogenic Conditions", *App. and Environ. Micro.* 55(9):2144–2151 (1989).

Haston et al., "Enhanced Reductive Dechlorination of Chlorinated Ethenes", Symposium on Bioremediation of Hazardous Wastes: Research, Development, and Field Evaluations, Jun. 28–30, 1994 pp. 11–14.

Hollinger et al., "A Highly Purified Enrichment Culture Couples the Reductive Dechlorination of Tetrachloroethene to Growth", *App. and Environ. Micro.* 59(9):2991–2997 (1993).

Major et al., "Field and Laboratory Evidence of In Situ Biotransformation of Tetrachloroethene to Ethene and Ethane at a Chemical Transfer Facility in North Toronto", *On Site Bioreclamation,* Hinchee and Olfenbuttel, Eds., Butterworth–Heinemann, Stoneham MA 1991 pp. 147–171.

Mohn and Tiedje, "Microbial Reductive Dehalogenation", *Bicrobiological Reviews* 56(3):482–507 (1992).

Sewell and Gibson, "Stimulation of the Reductive Dechlorination of Tetrachloroethene in Anaerobic Aquifer Microcosms by the Addition of Toluene", *Environ. Sol. Technol.* 25(5):982–984 (1991).

Fathepure B., Complete Degradation of Polychlorinated . . . App & Environ Micro 57 (12) 3418–3422 (1991).

De Bruin W., Complete Biological Reductive . . . App & Environ Micro 58 (6) 1996–2000 (1992).

*Primary Examiner*—Ralph Gitomer
*Attorney, Agent, or Firm*—Richard Aron Osman

[57] ABSTRACT

The invention provides methods and microbial cultures for the bioremediation of organic halide contaminated groundwater contaminated with organic halides, such as di- and trichloroethene. The methods involve adding, in situ to organic halide-contaminated groundwater a carbohydrate and one or more reductive dehalogenation factors, usually in the form of a nutrient extract, both in amounts sufficient to permit in situ reductive dehalogenation of the organic halide by a microbial population. The microbial population may be endogenous to the ground water or added exogenously. The nutrient-enriched ground water is then maintained in situ under reducing conditions to reductively dehalogenate the contaminating organic halide. Enriched bioremediation cultures are produced by adding to organic halide contaminated groundwater which comprises an endogenous microbial population capable of reductive dehalogenation of the organic halide a carbohydrate and frequently, one or more reductive dehalogenation factors. Thereafter, the nutrient-enriched groundwater is incubated under reducing conditions whereby the organic halide is reductively dehalogenated and the microbial population is selectively and numerically expanded to yield a bioremediation culture.

7 Claims, 2 Drawing Sheets

REDUCTIVE DEHALOGENATION OF ORGANIC HALIDES IN CONTAMINATED GROUNDWATER

The research carried out in the subject application was supported in part by grants from the National Institutes of Health. The government may have rights in any patent issuing on this application.

INTRODUCTION

1. Field of the Invention

The field of this invention is reductive dehalogenation of organic halides in contaminated groundwater.

2. Background

Halogenated hydrocarbons are widely used as industrial solvents and are the most common contaminants of ground water aquifers. Trichloroethene, a volatile chlorinated organic compound, has been used extensively in metal and glass industries as a solvent and degreasing agent and in household products such as spot removers, rug cleaners, and air fresheners. The U.S. E.P.A. has classified trichloroethene as a priority pollutant on the basis of its widespread contamination, its possible carcinogenicity, and its anaerobic bioconversion to a more potent carcinogen, chloroethene. Due to its widespread use, many ground water aquifers and waterways are contaminated with trichloroethene. A 1980 survey of the drinking water in 39 communities found that 23% of the wells were contaminated with tri- and dichloroethenes and other halogenated aliphatic compounds. A large number of tnchloroethene-contaminated sites exist in Northern California, primarily at locations where silicon wafers were manufactured and at military air bases.

There are a number of methods to alleviate contamination of ground water by organic pollutants. These include physical containment, in situ treatment with chemicals or microorganisms, and withdrawal prior to physical, chemical, or biological treatment. A common technique is to pump the contaminated ground water to the surface and then remove the contaminant by air stripping or by adsorption on activated carbon (pump-and-treat). Unfortunately, this technique transfers the contamination to another medium, i.e., to the atmosphere in air stripping treatment and to carbon in carbon adsorption. Due to adsorption of the contaminant onto soil particles, pump-and-treat methods must be used for decades in order to detoxify a site.

Aerobic biodegradation of halogenated hydrocarbons has been applied in a limited number of sites. However, due to toxicity of intermediates, possible inhibitory levels of copper in the contamination site, the inability to dechlorinate tetrachloroethene, the need to oxygenate the aquifer, and toxic substances needed to induce degradative pathways, aerobic degradation is not always possible. Anaerobic degradation of halogenated hydrocarbons may be more practical in some situations. Several recent reports suggest that complex cultures can reductively dehalogenate polychloroethene in vitro. Unfortunately, anaerobic degradation rates were reported to be several orders of magnitude lower than aerobic rates. Furthermore, incomplete degradation of trichloroethene leads to the accumulation of chloroethene, an undesirable product.

Given that the cost to treat a small contamination site usually exceeds $100,000/yr for even very small sites and given the widespread trichloroethene contamination problem, the market for an efficient and effective method of trichloroethene bioremediation is in the billions of dollars. The availability of methods for complete dechlorination would be extremely valuable to the Department of Defense, due to widespread trichloroethene contamination problems at military air bases, and to the aerospace, metal plating and semiconductor industries.

RELEVANT LITERATURE

1. W. P. d. Bruin et al. 1992. Complete biological reductive transformation of tetrachloroethene to ethane. *Appl. Environ. Microbiol.* 58:1996–2000.
2. T. D. DiStefano, J. M. Gossett, & S. H. Zinder. 1991. Reductive dechlorination of high concentrations of tetrachloroethene to ethane by an anaerobic enrichment culture in the absence of methanogenesis. *Appl. Environ, Microbiol.* 57:2287–2292.
3. T. D. DiStefano, J. M. Gossett, & S. H. Zinder. 1992. Hydrogen as an electron donor for dechlorination of tetrachloroethene by an anaerobic mixed culture. *Appl. Environ. Microbiol.* 58:3622–3629.
4. B. Z. Fathepure & T. M. Vogel. 1991. Complete degradation of polychlorinated hydrocarbons by a two-stage biofilm reactor. *Appl. Environ. Microbiol.* 57:3418–3422.
5. D. L. Freedman & J. M. Gossett. 1989. Biological reductive dechlorination of tetrachloroethylene and trichloroethylene to ethylene under methanogenic conditions. *Appl. Environ. Microbiol.* 55:2144–2155.
6. D. L. Freedman & J. M. Gossett. 1991. Biodegradation of dichloromethane and its utilization as a growth substrate under methanogenic conditions. *Appl. Environ. Microbiol.* 57, 2847–2857.
7. C. Holliger et al. 1993. A highly purified enrichment culture couples reductive dechlorination of tetrachloroethene to growth. *Appl. Environ. Microbiol.* 59:2991–2997.
8. W. M. Mohn & J. M. Tiedje. 1992. Microbial reductive dehalogenation. *Microbiol. Rev.* 56:482–507.
9. D. W. Major, E. W. Hodgins and B. J. Butler 1991. Field and Laboratory Evidence of In Situ Biotransformation of Tertachloroethene to Ethene and Ethane at a Chemical Transfer Facility in North Toronto, in *On Site Bioreclamation,* Hinchee and Olfenbuttel, Eds, Butterworth-Heinemann, Stoneham Mass.
10. Sewel and Gibson 1991. Stimulation of the Reductive Dechlorination of Tetrachloroethene in Anaerobic Aquifer Microcosms by the Addition of Toluene. *Environ Sci Technol.* 25, 982–984.

SUMMARY OF THE INVENTION

The invention provides compositions and methods for the bioremediation of organic halide contaminated groundwater. The methods generally involve adding, in situ to organic halide-contaminated groundwater a carbohydrate and optionally, one or more reductive dehalogenation factors, usually in the form of a nutrient extract, both in amounts sufficient to permit in situ reductive dehalogenation of the organic halide by a microbial population. The microbial population may be endogenous to the ground water or added exogenously. The nutrient-enriched ground water is then maintained in situ under reducing conditions to reductively dehalogenate at least a portion of the contaminating organic halide, thereby reducing the organic halide concentration of the groundwater.

The invention also provides isolated microbial cultures useful for bioremediation of organic halide contaminated groundwater. These microbial cultures are produced by adding to organic halide contaminated groundwater which comprises an endogenous microbial population capable of reductive dehalogenation of the organic halide a carbohydrate and optionally, one or more reductive dehalogenation factors, in amounts sufficient to permit in situ microbial reductive dehalogenation of the organic halide. Thereafter, the nutrient-enriched groundwater is incubated under reducing conditions whereby at least a portion of the organic halide is reductively dehalogenated and the microbial population is selectively and numerically expanded to yield a bioremediation culture. These bioremediation cultures are enriched for a microbial population capable of reducing the concentration of an organic halide present in groundwater by reductive dehalogenation.

The carbohydrate is usually a saccharide and is often provided as a mixture of saccharides such as corn syrup or molasses. Suitable organic halide contaminants for bioremediation according to the subject methods include halogenated hydrocarbons, preferably halogenated allies and alkenes, more preferably chlorinated alkanes and alkenes, most preferably di- and trichloroethene.

BRIEF DESCRIPION OF THE FIGURES

FIG. 1. Time course of trichloroethene degradation by ground water micro-organisms.

FIG. 2. Contours of tri-, 1,2-dichloroethene plume and locations of the extraction wells and monitoring wells at Santa Clara County site.

DETAILED DESCRIPTION OF THE INVENTION

Figure 1:
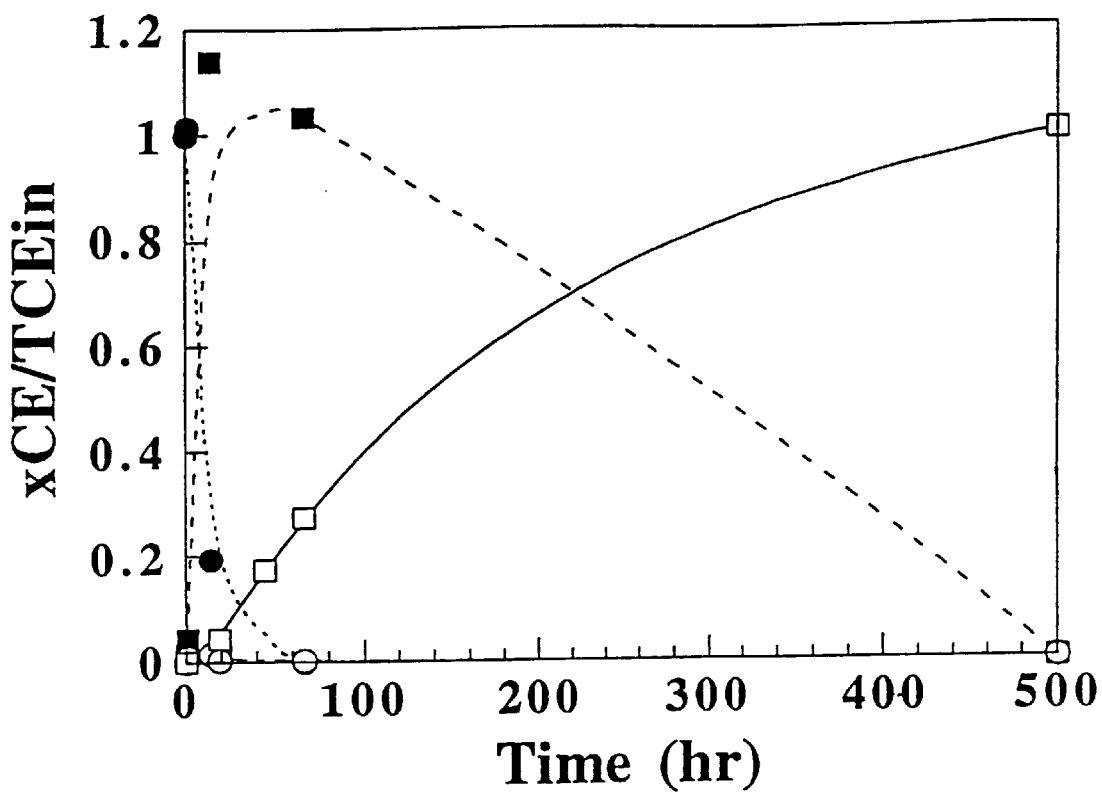

The invention provides compositions and methods for the bioremediation of organic halide contaminated groundwater. The methods and compositions are applicable to a wide variety of environmental sites subject to organic halide contamination including industrial sites, military bases, airports, manufacturing sites, dry cleaning plants, facilities for solvent transfer, storage and/or handling, landfills and disposal facilities, sites to which contaminated water and/or ground materials (mud, sludge, sand, soil, etc.) have been transferred, etc. Target groundwaters are relatively anaerobic meaning that the oxygen content of the subject water is less than $10^{-6}$ M, usually less than $10^{-8}$ M, more usually less than $10^{-10}$ M.

The methods and compositions are useful in the bioremediation of groundwaters contaminated with one or more of a wide variety of organic halides. Preferred applications include material contaminated with at least one halogenated hydrocarbon, preferably at least one halogenated alkane or alkene, more preferably a chlorinated aakane or alkene, most preferably di-, tri- or tetrachloroethene. Particularly useful applications include bioremediation of material contaminated with widespread organic halide pollutants, particularly those classified by the US E.P.A. as priority pollutants, more particularly those suspected as carcinogenic, teratogenic or potentially so.

By contaminated is meant that the resident groundwater contains an undesirable excess of the organic halide. Frequently, the organic halide concentration at target sites exceeds governmental mandates for the intended utilization of the site and/or groundwater. For example, where the target groundwater is not adequately sequestered from human water supplies, organic halide contamination encompasses the presence of any organic halide at a concentration in excess of governmental drinking water mandates. While the threshold concentration for bioremediation varies with the particular contaminant(s) (e.g. the half-life and toxicological hazards of), generally, contaminating organic halides suitable for bioremediation according to the subject methods are present at at least 0.05 ug/L, usually at at least 0.5 ug/L, more usually at at least 5 ug/L, most usually at at least 50 ug/L, and up to the water saturation concentration for the given organic halide.

According to one embodiment, the methods involve adding in situ at least one metabolizable carbohydrate to organic halide-contaminated groundwater. Usually, the carbohydrate is added in the form of a liquid, more usually as a concentrated aqueous solution. One or more of a wide variety of carbohydrates may be used. The carbohydrate may be provided in a relatively pure form such as a particular monosaccharide (esp. glucose, fructose and xylose), disaccharide (esp. sucrose, lactose, cellobiose and maltose), polysaccharide (esp. water soluble forms (e.g. partially hydrolyzed) starch, amylose and cellulose), etc., a mixture of carbohydrates, or, as is generally more cost effective, in a crude, relatively unpurified carbohydrate source such as corn syrup, molasses, etc.

Criteria for carbohydrate selection include the ability to promote, in conjunction with one or more reductive dehalogenation factors, efficient reductive dehalogenation as described herein, cost, stability, convenience of use and availability. Accordingly, preferred carbohydrates are metabolizable by a broad range of anaerobes, are non-toxic and otherwise environmentally safe, are relatively stable to non-biological chemical degradation in the site groundwaters, and are commercially available at relatively low cost. The ability of a particular carbohydrate to achieve reductive dehalogenation of a particular organic halide at a particular site is readily determined by assaying the carbohydrate with the later combination (preferably with a mixture or panel of candidate reductive dehalogenation factor-containing extracts), for the ability to promote reductive dehalogenation of the contaminating organic halide(s) as described herein.

In addition to the carbohydrate, for some groundwater-microbial population-organic halide combinations, it is found that one or more reductive dehalogenation factors may also be added in situ to improve the efficiency of reductive dehalogenation of the organic halide. Reductive dehalogenation factors are conveniently isolated from nutrient extracts found to have reductive dehalogenation factor activity by standard biochemical fractionation techniques (e.g. chromatography) and identified by conventional analytical techniques (e.g. spectroscopy). Isolated factors necessary for efficient reductive dehalogenation may be commercially purchased in pure or partially pure form, isolated from complex nutrient extracts or, alternatively, unfractionated nutrient extracts may be used as a convenient and cost-effective source of the factor(s). Hence, where the carbohydrate is provided as a rich mixture and/or nutrient extract sufficient to promote efficient reductive dehalogenation, a second supplemental solution comprising the reductive dehalogenation factors is not necessary. While exemplified with a yeast extract, a wide variety of nutrient extracts may be used including animal, plant, fungal and numerous microbial extracts. Specific examples include meat, embryo and egg extracts; tomato juice and algal extracts; and yeast extracts. The extract is preferably sterilized by heat or irradiation. While the necessary factors may be added in a purified state, it is generally more cost effective to use relatively crude extract, fractionated only by centrifugation, sedimentation or filtration.

Criteria for reductive dehalogenation factor source(s) selection include the ability to promote efficient reductive dehalogenation as described herein, cost, stability, source convenience and availability. Other candidate biological extracts are readily screened for suitability, e.g. by substituting for an extract (e.g. yeast extract) in a pre-defined carbohydrate-microbial population-organic halide combinations capable of reductive dehalogenation in the presence of the extract, and assaying for reductive dehalogenation of the organic halide as described herein.

The carbohydrate (and if used, the reductive dehalogenation factor source, e.g. nutrient extract) are added in amounts sufficient to permit detectable in situ reductive dehalogenation of the organic halide by a microbial population endogenous to the groundwater. Most conveniently, the carbohydrate(s) are added in liquid form or in concentrated aqueous solution. The amounts vary with the carbohydrate, the organic halide, the microbial population, and the presence of other compounds in the water. Hence, the amounts are necessarily determined empirically. Generally, for each $m^3$ of contanated water saturated ground, from 0.1 to 1,000 g, usually 0.5 to 500 g, more usually from 2 to 200 g, most usually from 10 to 100 g dry weight equivalent of carbohydrate is added. The number of cubic meters of contaminated material is determined by exploratory drillings to determine the contour for targeted threshold contamination (frequently EPA mandate maximum concentration) and the depth of the aquifer within that contour.

A wide variety of methods may be used for adding the carbohydrate(s) and reductive dehalogenation factor source (s) to the groundwater. The concentration of delivery wells, flow rates, etc. are largely determined by economics and local factors such as site conditions, composition, utilization and topography. For many sites, 1 gallon per minute will be a minimum flow rate. Methods for administering liquid reagents to aquifers, include boring, pumping, siphoning, etc. are well known in the art, see, eg. MacDonald and Rittmann (October, 1993) Environmental Science & Technology, Vol. 27, No. 10, pp. 1974–79.

The carbohydrate-enriched groundwater is then maintained in situ under reducing conditions (incubated) to reductively dehalogenate at least a portion of the contaminating organic halide, thereby reducing the organic halide concentration of the groundwater. By reducing conditions is meant that the groundwater is maintained at less (more negative) than about 300 mV, preferably less than about 100 mV, more preferably less than about –100 mV, and more preferably less than about –300 mV standard reducing potential (i.e. in reference to a hydrogen electrode, pH 7, at 25° C.). Reducing potential may be determined by any convenient way such as an electrode (e.g. silver-silver chloride), chemical indicator, etc. Reductive dehalogenation requires the maintenance of anaerobic conditions, preferably methanogenic conditions. Maintaining groundwater under such conductions generally involves limiting atmospheric access to the aquifer by capping/closing any intruding wells. Where the groundwater reduction potential is or becomes undesireably oxidative, a reducing agent, preferably in the form of the administered carbohydrate source, may be added.

The groundwater is incubated for a time sufficient to significantly reduce the organic halide concentration, generally from above to within acceptable levels (i.e. exceed governmental or regulatory e.g. EPA mandates). Frequently, the concentration is reduced by at least 25% (e.g. reduced from more than 8 $\mu$g/L to less than 6 $\mu$g/L), usually by at least 50%, more usually by at least 75%, most usually by at least 90% (w/v). By reductively dehalogenate is meant that a hydride is added to the organic halide and a halide anion is lost. In bulk, a detectable portion of the organic halide is converted to a more reduced form; e.g. trichloroethene to dichloroethene. In a preferred embodiment, the organic halide is completely reductively dehalogenated meaning that all the halide groups of the organic halide are replaced with hydride groups. In bulk, a detectable portion of the organic halide is converted to a completely reduced form; e.g. trichloroethene to ethene. In preferred embodiments, these portions are at least 20%, preferably at least 60%, more preferably at least 80%, most preferably at least 90% by weight of the average concentration of the subject organic halide portion present in the defined contaminated portion of the aquifer.

The groundwater is maintained under reducing conditions at least long enough to permit the requisite reductive dehalogenation. While the incubation time will vary widely with the contaminant, microbial population, reaction conditions, etc. and is necessarily empirically determined by time-course monitoring as described herein, generally the necessary incubation period to is from a week and up to 10 years, though usually less than 3 years, more usually less than 1 year and preferably less than 6 months. According to one embodiment of the invention, the groundwater comprises a microbial population capable of reductive dehalogenation of the subject organic halide. Typically, this is evidenced inferentially by the presence of reduced products or directly by slow in situ degredation. Here the method is used to effect complete reduction, or enhance the efficiency of or expedite the rate of reductive dehalogenation. The method increases the rate of dehalogenation by at least 33%, preferably at least 100%, more preferably at least 300%, most preferably at least 1,000% as measured by the extrapolated time to effect a selected reduction (typically, complete reduction) of the first 25% by wt of the target organic halide. Where the endogenous reductive dehalogenation is not complete, the method may be used to provide complete reduction as described above.

The invention also provides isolated microbial cultures useful for bioremediation of organic halide contaminated groundwater. These microbial cultures are produced by adding to organic halide contaminated groundwater which comprises an endogenous microbial population capable of reductive dehalogenation of the organic halide a carbohydrate in an amount sufficient to permit in situ microbial reductive dehalogenation of the organic halide. Where necessary to promote reductive dehalogenation of the organic halide, reductive dehalogenation factors, usually in the form of a nutrient extract, are also added to the groundwater in an amount sufficient to permit in situ microbial reductive dehalogenation of the organic halide.

Thereafter, the nutrient-enriched groundwater is incubated under reducing conditions whereby at least a portion of the organic halide is reductively dehalogenated and the microbial population is selectively and numerically expanded to yield a bioremediation culture. By selectively expanded is meant that the subject microbial population numerically expands at a rate in excess of that of the other microbes in the groundwater, preferably at least 50% faster, more preferably at least twice as fast, most preferably at least 10-times as fast as the aggregate growth rate of the other microbes in the groundwater. Generally the incubation permits the subject population to expand by at least 2-fold, preferably by at least 10-fold, more preferably by at least 100-fold, most preferably at least 1,000-fold, numerically. These bioremediation cultures are enriched for a microbial population capable of reducing the concentration of an organic halide present in groundwater by reductive dehalogenation. By enriched is meant that proportion of microbes represented by the subject population is increased relative to the total microbes as compared with the original groundwater.

These enriched bioremediation cultures find use in another disclosed method of groundwater bioremediation. This method is practiced as described above except that an exogenous microbial population is added. According to this embodiment of the invention, a microbial culture capable of reductively dehalogenating the target organic halide (e.g. at least one such bioremediation culture, a microbial culture derived from such a bioremediation culture, a groundwater inoculate containing such microbes, etc.), a carbohydrate and, optionally, a nutrient extract are added in situ to organic halide contaminated groundwater in amounts sufficient to permit in situ microbial reductive dehalogenation of the organic halide. The exogenous microbes are added in situ in amounts sufficient to effect the desired reductive dehalogenation of the target organic halide. Effective microbe concentrations typically range from $10^3$/ml to $10^5$/ml, usually about $10^4$/ml groundwater ($10^9$/m$^3$ ground material assuming a porosity providing 30% water by volume). The effective microbial concentration can also be effected by seeding the groundwater with a lower concentration (e.g. typically in the range of 1 to $10^2$/ml groundwater) and providing conditions (e.g. nutrients and time) sufficient to permit the growth of the inoculate to an effective concentration. Thereafter, the nutrient-enriched inoculated groundwater is incubated in situ under substantially reducing conditions to reductively dehalogenate at least a portion of the organic halide, as described above.

The following examples are offered by way of illustration and not by way of limitation.

EXAMPLES

Example 1

In Vitro Complete Reductive Dechlorination of Trichloroethene in Contaminated Groundwater.

Complete anaerobic dechlorination of trichloroethene by groundwater isolates has never been reported. Here we show that an anaerobic mixed culture enriched from a contaminated ground water aquifer can degrade trichloroethene completely to ethene, and that anaerobic degradation rates are comparable to aerobic degradation rates.

The TCE contaminated site used in the present study is located in Santa Clara County, California. The groundwater aquifer occurs between 15 and 20 ft. It is contaminated with tetrachloroethene, trichloroethene, cis-1,2-dichloroethene, chloroethene, Freon 113, dichloro-difluoroethene, and di- and trichlorobenzenes. It also has elevated levels of ammonia and sulfates. The test wells at the site are approximately 20 ft. deep. Prior to sampling water from the well, the water was turned on and allowed to flow for several minutes to remove any stagnant water in the lines.

Several 160-ml serum bottles containing 50-ml of a minimal salts medium were anaerobically inoculated with 50-ml of groundwater from the site well. The waterline was connected to the bottles via a sterile needle, and 50-ml of groundwater was added anaerobically to the bottles, displacing the nitrogen headspace above the medium. The medium contained 0.20 g/l $NH_4Cl$, 0.10 g/l $K_2HPO_4$—$3H_2O$, 0.055 g/l $KH_2PO_4$, 0.20 g/l $MgCl_2$—$6H_2O$, 0.1 g/l $MnCl_2$—$4H_2O$, 0.17 g/l $CoCl_2$—$6H_2O$, 0.10 g/l $ZnCl_2$, 0.20 g/l $CaCl_2$, 0.019 g/l $H_3BO_4$, 0.05 g/l $NiCl_2$—$6H_2O$, 0.020 g/l $Na_2MoO_4$—$2H_2O$, 0.50 g/l $Na_2S$—$9H_2O$, 0.10 g/l $FeCl_2$—$4H_2O$, 5.0 g/l $NaHCO_3$, and 0.050 g/l yeast extract. The pH was adjusted to 7 with NaOH or HCl. Resazurin (0.001 g/l) was added as an indicator of the reducing environment. Carbon sources (methanol, acetate, succinate, or glucose) were added to the bottles to a final concentration of 1 mM. Trichloroethene was added to each bottle by injecting 25 µl of trichloroethene-saturated water. The bottles were incubated at 30° C. for 10 days until trichloroethene-degradation activity appeared.

A 5 L groundwater sample also was collected from the same site anaerobically into a 10 L stainless steel vessel. The stainless steel vessel had been autoclaved and filled with oxygen-free nitrogen. The waterline was connected to the vessel and allowed to displace the nitrogen in the vessel. The water was then transported to the laboratory where it was used to inoculate 160-ml serum bottles. Specifically, 100-ml aliquots of the extracted groundwater were anaerobically transferred to 160-ml serum bottles. Glucose was added to the bottles to a final concentration of 1 mM. Trichloroethene was added to each bottle by injecting 25 ml of trichloroethene-saturated water. The bottles were incubated at 30° C. for 10 days until trichloroethene-degradation activity appeared.

The total mass of trichloroethene, dichloroethene, chloroethene, and ethene were determined by sampling the headspace in a 160-ml culture bottle and injecting the sample onto two different Varian gas chromatographs equipped with flame-ionization detectors. One was equipped with a capillary column (AT-624; Alltech; Deerfield, Ill.) in order to measure trichloroethene and cis-1,2-dichloroethene. The other chromatograph was equipped with a Poropak Q column (Hewlett Packard; Avondale, Pa.) in order to measure chloroethene and ethene. The peaks were identified by comparison with pure compounds, and the concentrations were calibrated with known amounts of the pure compound. The concentration of any component in the headspace was related to the concentration in the medium by calculating a Henry's Law constant for that component.

FIG. 1 shows time course data of trichloroethene degradation by ground water microorganisms. The final data point was collected several hundred hours after inoculation when the culture had degraded trichloroethene completely to ethene. The filled circles represent trichloroethene as a mole fraction of trichloroethene inoculated into the culture; the open circles represent cis-1,2-dichloroethene as a mole fraction of inoculated trichloroethene; the filled squares represent chloroethene as a mole fraction of inoculated trichloroethene; and the open squares represent ethene as a fraction of inoculated trichloroethene. The chloroethene point above 1 is due to scatter in the data.

The cultures enriched in the complete medium containing glucose showed trichloroethene degradation activity after 10 days of incubation. The culture degraded 0.5 mg/ml trichloroethene to below detectable limits (<0.5 ug/ml) in 20 hours. The intermediate product appears to be cis-1,2-dichloroethene, which is later degraded to chloroethene. Approximately 20 hours after the enriched culture began degrading trichlorethene, the culture was able to transform chloroethene to ethene. The cultures inoculated in medium and sand showed no difference in their ability to degrade trichloroethene. In separate experiments, we have shown that anaerobic trichloroethene degradation will not occur in medium not inoculated with ground water samples.

| | Chlorinated Ethene | | | |
|---|---|---|---|---|
| Carbon Source | Trichloroethene | Dichloroethene | Chloroethene | Ethene |
| Glucose | − | − | − | ++++ |
| Acetate | − | − | + | + |
| Formate | − | + | ++ | + |
| Methanol | − | + | ++ | + |

Table 1 shows the degradation of trichloroethene with various carbon sources. Serum bottles are inoculated with 50 ml of yeast extract supplemented medium, 50 ml of site water and the indicated carbon source as described above. The chlorinated ethenes are followed by gas chromatographic analysis. Shown above are end point results of the degradation. Each plus indicates the presence of 20–25% by mole fraction of the original TCE added; a minus indicates mole fraction of less than 10%. Glucose degraded trichloroethene completely to ethene, see slso FIG. 1. In contrast, the cultures enriched on acetate significantly reduced trichloroethene and dichloroethene concentrations but did not effect a complete reduction of chloroethene to ethene, while the formate and methanol cultures retained significant concentrations of both dichloroethene and chloroethene.

| | Chlorinated Ethane | | | |
|---|---|---|---|---|
| Carbon Source | Trichloroethene | Dichloroethene | Chloroethene | Ethene |
| Glucose | − | − | − | ++++ |
| Fructose | − | − | − | ++++ |
| Xylose | − | − | − | ++++ |
| Sucrose | − | − | − | ++++ |
| Lactose | − | − | − | ++++ |

Table 2 shows the degradation of trichloroethene with various carbohydrates. Serum bottles are inoculated with 50 ml of yeast extract supplemented medium, 50 ml of site water and the indicated carbon source as described above. The chlorinated ethenes are followed by gas chromatographic analysis. Shown above are end point results of the degradation. Each plus indicates the presence of 20–25% by mole fraction of the original TCE added; a minus indicates mole fraction of less than 10%. As with glucose, fructose, xylose, lactose and sucrose are capable of effecting the complete degradation trichloroethene completely to ethene.

Example 2

In Situ (Field) Complete Reductive Dechlorination of Trichloroethene in Contaminated Groundwater.

Figure 2:
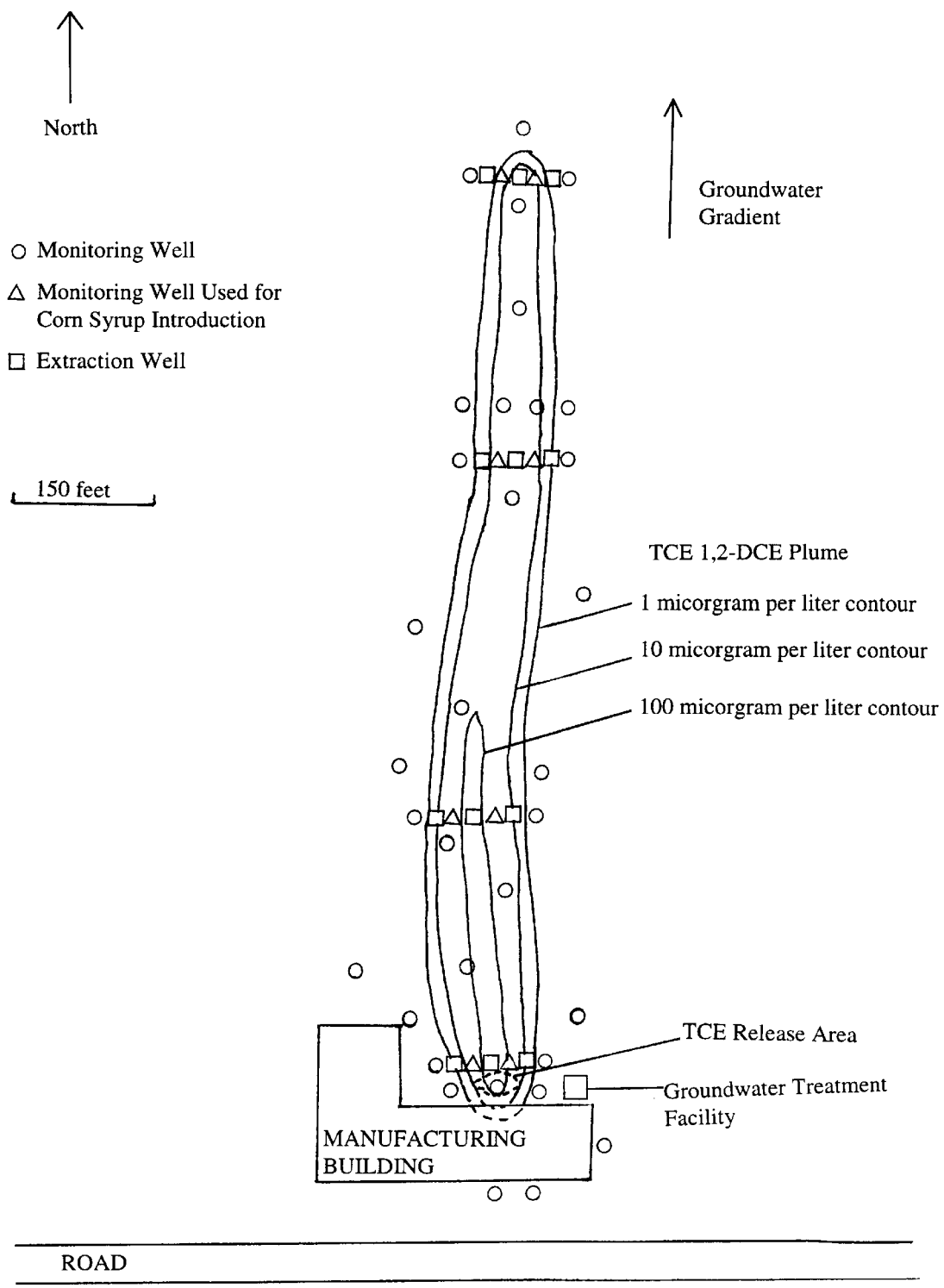

This application of the process involved a shallow aquifer below a former industrial facility located in Santa Clara County, California contaminated with both trichloroethene and 1,2-dichloroethene. Releases of TCE are believed to have occurred at the facility prior to 1980. The highest concentration of each is approximately 300 micrograms per liter and approximately 200 micrograms per liter, respectively. Water in the aquifer flows from south to north at an average velocity of 150 feet per year. TCE and 1,2-DCE spread northward from the facility in a plume 1000 feet long and 100 feet wide. The aquifer is approximately 10 feet thick and the porosity is approximately 30%. Extraction wells are arranged in rows of three across the plume at the facility and at approximately 300 feet, 700 feet and 1000 feet north of the facility. Monitoring wells are arranged in rows of four, aligned with the extraction wells. Additional monitoring wells are located around the facility. Locations of the extraction wells and monitoring wells are shown in FIG. 2. Groundwater is pumped from each of the extraction wells to a central treatment system, where air stripping removes the chlorinated ethenes from the water.

The volume of water in the plume is approximately 9,000 cubic meters. The water contains approximately 0.1 mM nitrate and 0.5 mM sulfate. The water is determined to be anaerobic because there has been conversion of some of the TCE to 1,2-DCE; however, for calculating carbohydrate source requirements, an allowance for 0.1 mM oxygen is made. Using glucose as the carbohydrate source, the amounts-required to reduce the nitrate to nitrogen, sulfate to sulfide, and oxygen to water are 0.02 mM, 0.17 mM, and 0.017 mM, respectively. The amounts of glucose required to reduce the TCE and 1,2-DCE to ethene are 0.0006 mM and 0.0003 mM, respectively. The total of these requirements is 0.21 mM. To account for mixing and utilization inefficiencies the target concentration for injection is 10×(2.1 mM) of glucose. Thus, the glucose requirement is 19,000 moles or 3400 kilograms.

The glucose is introduced into the aquifer using the existing extraction and monitoring wells. To make the introductions, all of the extraction wells, except those 1000 feet north of the facility are shut down. Glucose, in the form of corn syrup, is diluted with water, mixed with yeast extract, and introduced into each of the shutdown extraction wells, each of the adjacent monitoring wells, and the three monitoring wells south of the probable TCE release location. The shut down extraction wells remain off for six months. At the end of six months, the extraction wells are restarted. Reductive dehalogenation of contaminating TCE is documented. Introductions of glucose and yeast extract are repeated in the appropriate wells until the concentration of chlorinated ethenes remains below the regulatory threshold. Corn syrup is purchased as approximately 70 weight percent solution in 55-gallon drums. Each drum contains approximately 200 kilograms of glucose. Seventeen drums contain the necessary amount of glucose; however, because there are 18 wells into which the glucose is introduced, 18 drums are used.

The target concentration for yeast extract is 50 grams per cubic meter. A total of 450 kilograms of yeast extract is necessary. Yeast extract is purchased as dry powder in 50-pound containers. A total of 20 containers is used. The corn syrup is diluted to approximately 3.5 percent with water as it is introduced into the aquifer. One drum of corn syrup and 25 kilograms of yeast extract is needed for each well. The corn syrup is dispensed directly out of the drum using a peristaltic metering pump. The drum is fitted with a heating blanket and maintained over 25° C. The yeast extract is dissolved in hot water (approx 60° C.) in a 100-gallon tank equipped with an immersion heater and a mixer. The yeast extract is dispensed from the tank using a peristaltic metering pump. Dilution water is supplied from a source that is free of chlorine, chloramines, and chlorine by-products. The dilution water flow is metered and regulated. Corn syrup and yeast extract enter the dilution water line downstream of the flow regulating valve. A static mixer is located in the dilution water line downstream of the points of entry for the corn syrup and yeast extract. Downstream of the static mixer, the line enters the well. The line extends to within one foot of the bottom of the well. The flow of dilution water is regulated so that at least three feet of freeboard is maintained in the well. The speeds of the metering pumps are regulated to match the flow of dilution water.

All publications and patent applications cited in this specification are herein incorporated by reference as if each individual publication or patent application were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method of bioremediation of organic halide contaminated groundwater, said method comprising the steps of:
   (a) adding, in situ to groundwater contaminated with an organic halide and comprising a microbial population capable of reductive dehalogenation of said organic halide, a carbohydrate in an amount sufficient to permit in situ microbial reductive dehalogenation of said organic halide, and thereafter
   (b) incubating said groundwater in situ under substantially reducing conditions to completely reductively dehalogenate at least a portion of said organic halide, whereby the concentration of said organic halide in said groundwater is reduced,
   wherein said organic halide is a halogenated hydrocarbon.

2. A method according to claim 1, wherein said organic halide is trichloroethene.

3. A method according to claim 1, wherein said substantially reducing conditions provide a reducing potential of at least 100 mV.

4. A method according to claim 1, wherein said substantially reducing conditions provide a reducing potential of at least −300 mV.

5. A method according to claim 1, wherein said concentration of said organic halide in said groundwater is reduced by at least 25% (wt/vol) from an initial concentration of greater than 5 ug/L.

6. A method according to claim 1, wherein said carbohydrate is a monosaccharide or disaccharide.

7. A method according to claim 1, wherein said carbohydrate is glucose.

* * * * *